United States Patent [19]

Hayward et al.

[11] 4,274,119
[45] Jun. 16, 1981

[54] RECORDING DISK COVER AND PLAYER APPARATUS FOR REMOVING COVER

[75] Inventors: Curtis E. Hayward, Wappingers Falls; Friedhelm Maurer, Poughquag, both of N.Y.

[73] Assignee: Discovision Associates, Costa Mesa, Calif.

[21] Appl. No.: 973,421

[22] Filed: Dec. 26, 1978

[51] Int. Cl.³ ............... G11B 5/012; G11B 23/02; G11B 25/04
[52] U.S. Cl. ............... 360/97; 206/312; 360/99; 360/133
[58] Field of Search ............... 360/99, 97, 98, 86, 360/133, 135; 206/444, 309, 312, 313

[56] References Cited

U.S. PATENT DOCUMENTS

| | | | |
|---|---|---|---|
| 3,668,658 | 6/1972 | Flores et al. | 206/444 |
| 3,836,731 | 9/1974 | Wilisch et al. | 360/86 |
| 3,891,796 | 6/1975 | Takahara et al. | 360/99 |
| 3,899,181 | 8/1975 | Dannert et al. | 360/133 |
| 3,908,824 | 9/1975 | Takahara et al. | 206/312 |
| 3,941,391 | 3/1976 | Ohmiya et al. | 179/100.1 DR |
| 4,040,106 | 8/1977 | Medley | 360/99 |
| 4,063,286 | 12/1977 | Takahara et al. | 360/86 |
| 4,089,029 | 5/1978 | Castrodale et al. | 360/99 |
| 4,124,866 | 11/1978 | Coleman | 360/97 |
| 4,152,739 | 5/1979 | DeMoss et al. | 360/99 |

Primary Examiner—Alfred H. Eddleman
Attorney, Agent, or Firm—Ronald J. Clark; W. S. Robertson

[57] ABSTRACT

A cover for a video record has a generally unbroken rectangular perimeter. A record player has permanent magnets that cooperate with paramagnetic inserts in the record cover to open the cover for loading and unloading a recording disk. The player has a clamp mechanism that enters the opened cover to clamp the disk for these operations.

8 Claims, 13 Drawing Figures

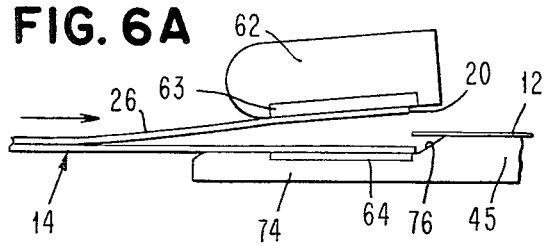
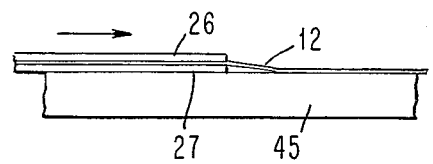
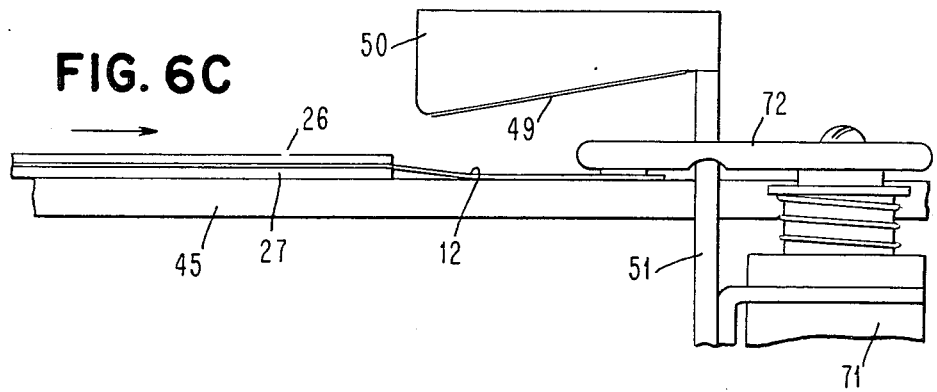
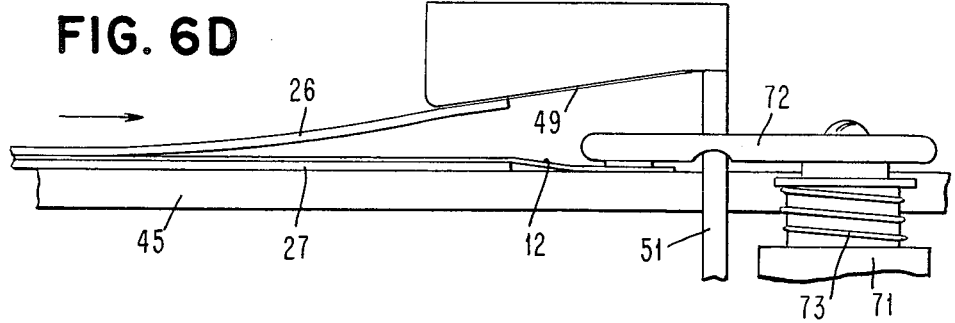
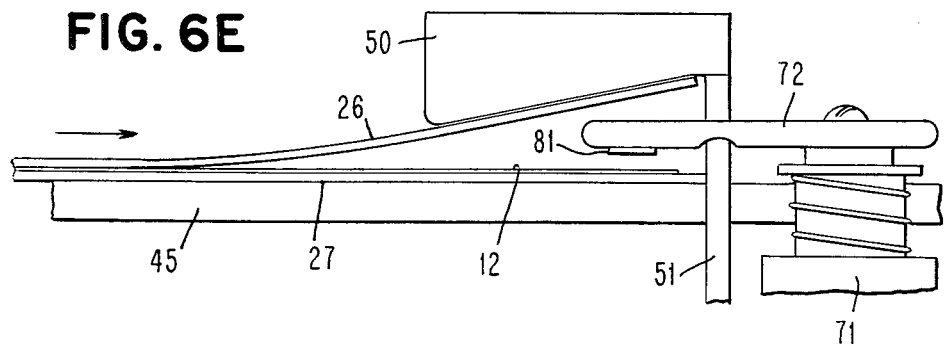

4,274,119

RECORDING DISK COVER AND PLAYER APPARATUS FOR REMOVING COVER

INTRODUCTION

OBJECTS OF THE INVENION

Because a video disk has a very high storage density, small scratches or fingerprint smears and the like can destroy a large amount of data, and the prior art has proposed record covers that would either remain on the disk while the disk is being played or would be removed from the cover only after the cover had been loaded into the player. The removable disk would be reinserted into the cover by again inserting the cover into the player and over the disk. If the disk runs inside the record cover, the cover normally has openings for receiving a hub that drives the disk and for receiving a read or read/write head. For example, see Castrodal U.S. Pat. No. 4,089,029 and Flores U.S. Pat. No. 3,668,658.

When the cover is intended to be removed from the disk for playing, it has ordinarily been necessary to provide openings in the cover for access by the disk handling apparatus. For example the cover may have an opening for a hub apparatus to grasp the center hole of the disk and may have a slot from the center hole to the front edge of the cover to permit the cover to be removed from the disk. Alternatively, the cover may have cutouts along its front edge to expose an edge of the disk so that it is accessible to a clamp. The front edge of the cover may also have dissimilar cutouts so that the player mechanism can grasp the edges of the cover to open the cover to permit a clamp to enter the cover to clamp the disk. An object of this invention is to provide a new and improved record cover that is substantially rectangular in its outer perimeter without openings or cutouts for these purposes. Another object of the invention is to provide a new and improved record player that cooperates with the new record cover.

SUMMARY OF THE INVENTION

The record cover of this invention has paramagnetic inserts along its front edge. The record player has a permanent magnet located at the front of the player that attracts the inserts to open the record cover as the cover is inserted into the player for unloading a record. The open front of the cover then slips over the disk.

The player also has a permanent magnet located at the rear of the player that attracts the inserts and lifts the upper flap of the cover as the cover is inserted to the full rearmost position of the player for either a load or unload operation. A clamp located at the rear of the player enters the opened flap of the record cover and clamps the recording disk. For a record loading operation, the clamp holds the disk and the underlying lower flap of the record cover against a supporting plate of the player. The disk and the record flap are arranged to have a suitable coefficient of friction so that the record cover can be withdrawn from under the clamp while the disk is held in place. For a unload operation, the clamp similarly holds the record as the lower front flap of the record cover is moved under the disk and the overlying clamp. This clamping action prevents the record cover from being accidently withdrawn from the player with the disk only partially returned to the cover.

The record cover and the player also cooperate to align the disk properly in the player for the disk to be engaged by a hub of the drive mechanism.

THE DRAWING

FIGS. 6A through 6E are a sequence of simplified views of a record, the record cover, and the player illustrating the steps of loading a record into the player.

THE PREFERRED RECORD COVER AND PLAYER

Figure 1:
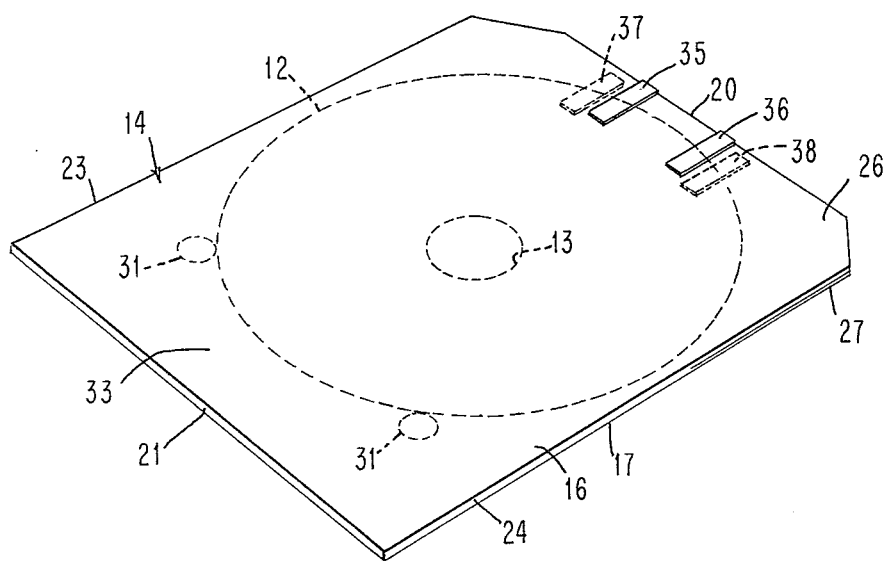
FIG. 1 is a perspective of the video record cover of this invention.

The Recording Disk And Cover of FIG. 1

FIG. 1 shows the recording disk (or record) 12 in dashed lines. The disk is circular and has a diameter of about twelve inches and has a center hole 13. The disk is preferably a floppy disk but the record cover and player that will be described can also be used with an otherwise similar rigid disk. The record cover 14 has two parts that will arbitrarily be called the upper part 16 and the lower part 17. Also, edge 20 of the cover will be called the front and edge 21 will be called the rear; similarly the region of edge 23 will be called the left side and the region near edge 24 will be called the right side. The two parts 16, 17 are sealed together along back edge 21. The components of the record cover that have been described so far are generally similar to familiar audio phonograph record covers, and the record cover of this invention may be manufactured of similar materials by similar techniques.

The cover is sealed along a portion of each side edge 23 and 24 but parts 16, 17 are separated along the front edge 20 and a portion of each side edge to form two separable flaps 26, 27 having side edges that extend rearwardly for a sufficient distance for the flap opening operations that will be described later. The upper and lower parts 16, 17 are sufficiently flexible with respect to the distance along separating edges that flaps 26 and 27 open without a fold or hinge across the cover.

The record cover has suitable spacers 31 that are positioned between the upper and lower parts 16, 17 of the cover to maintain a separation for receiving the recording disk 12. The spacers 31 also limit the rearward travel of the disk into the cover and thereby define a portion 33 of the record cover that extends outwardly from the record player cabinet during the load and unload operations that will be described later and thus forms a holding portion for the record cover. Portion 33 also prevents the door from being closed with the cover loaded and through door and doormotor interlock system prevents the player from being operated. It is contemplated that the spacing function and the travel limiting function of the elements 26 can be provided by separate structures in the record cover but the structure of FIG. 1 is particularly advantageous.

Figure 3:
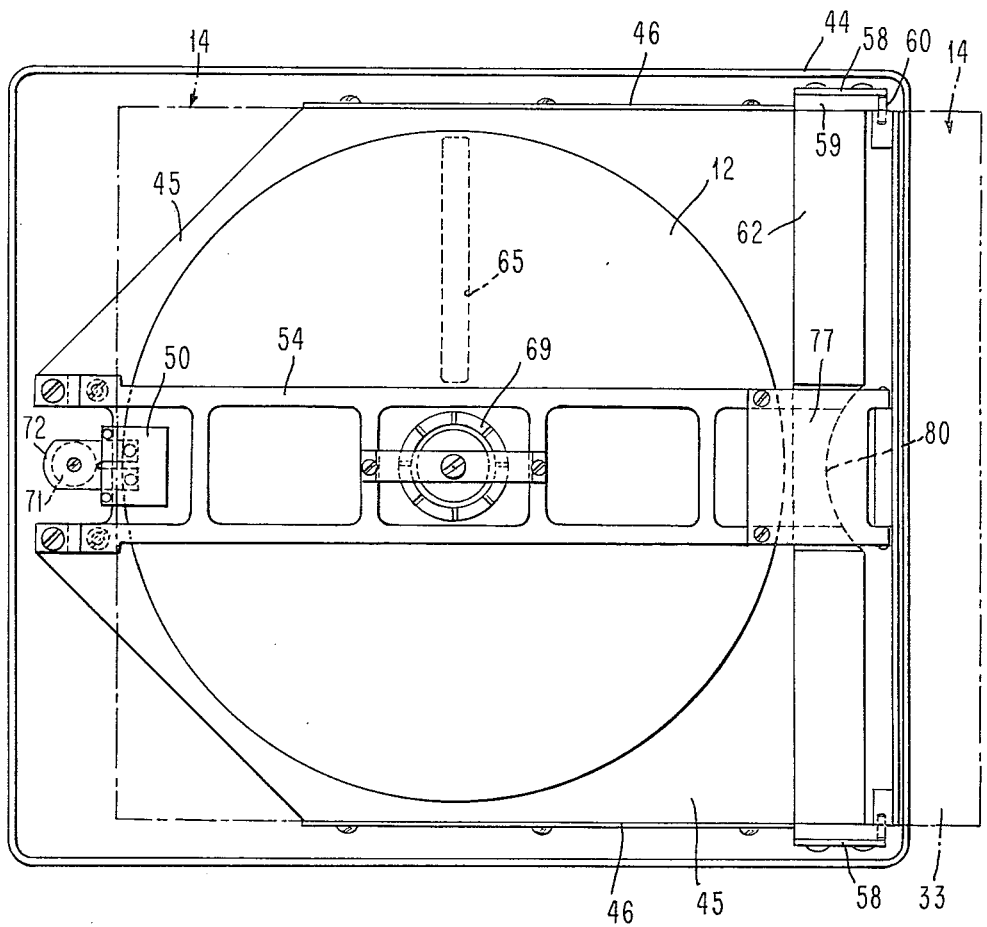
FIG. 3 is a plan view of the video record player with cover removed and door closed.

The front edge 20 of the cover is shown with diagonally cut off front corners that help to guide the cover into the player. Squared corners are also suitable and are shown in FIG. 3.

The flaps may have means (not shown) that hold the flaps together to prevent the disk from falling out of the cover or from otherwise becoming exposed. Snaps, tabs or the like that can be easily released by a user are suitable. It is not necessary to maintain an airtight seal.

The upper flap 26 of the record cover carries a pattern of paramagnetic inserts 35, 36 that extend a predetermined distance to the rear from near the front edge of the flaps. Lower flap 27 carries similar inserts 37, 38 shown in dashed lines that are arranged in a different pattern. The inserts are arranged so that they do not obstruct the otherwise smooth surface of the inside of the record cover, and the inserts are also arranged to preserve a smooth outer surface both for appearance and to facilitate loading and unloading the cover in a player. The inserts can be conveniently sandwiched between laminations of paper or other material forming the record cover, they can be molded into a plastic record cover or otherwise constructed to achieve smooth surfaces. Other aspects of the paramagnetic inserts will be described later in their relation to components of a player.

FIG. 1 has been described in relation to a single sided record. For a record that can be played on either side it is still convenient to refer to parts 19 and 20 as the upper and lower parts and the pattern of magnetic inserts is located in the top and bottom flaps 23, 24 in an offset, symmetrical pattern that will be understood from the later description.

Figure 2:
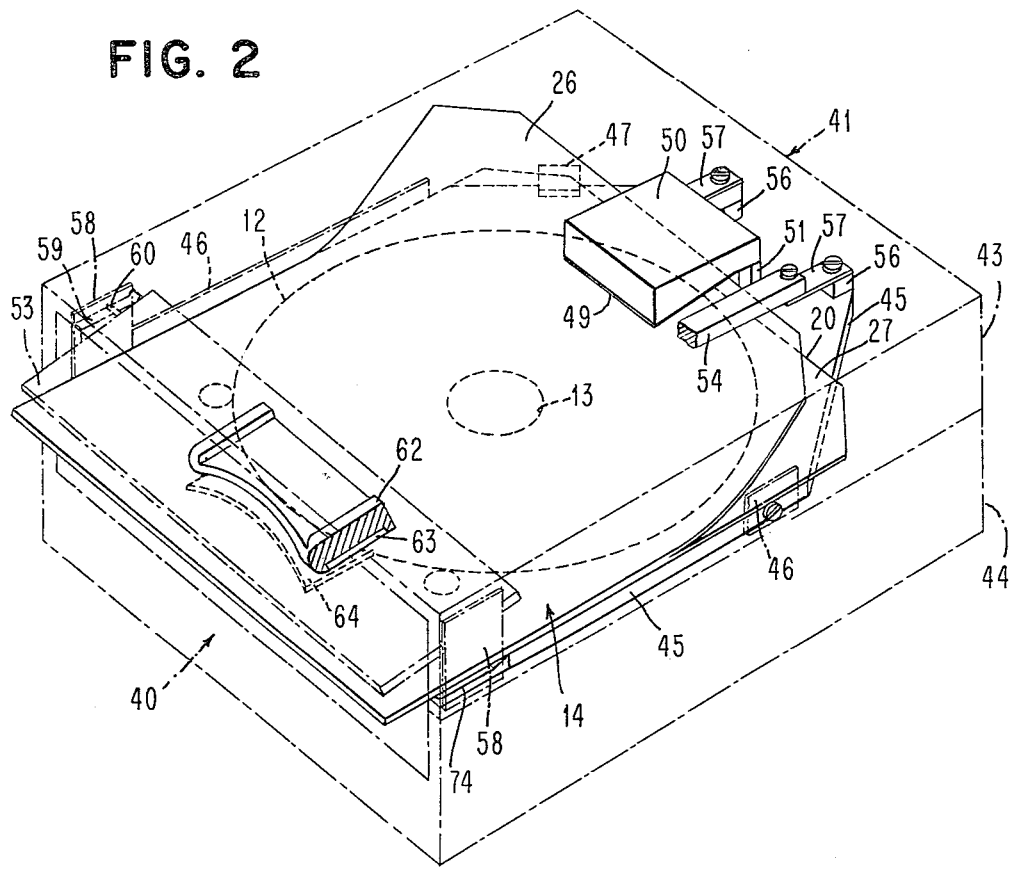
FIG. 2 is an overall schematic of the video record player of this invention with the record and cover inserted.

The Player Apparatus of FIG. 2

The record 12 and components of the record cover that have been described already can be readily seen in the phantom view of FIG. 2. The reference 40 designates the front of the player and reference 41 designates the rear; the sides can be called right and left as has been explained for the record cover. The player has an outer enclosure that can be constructed as an upper part 43 and a lower part 44 that are separable for maintenance but not for ordinary use. The lower part 44 carries a plate 45 that forms a Bernoulli plate for a floppy disk or otherwise forms a supporting surface for the record cover during load and unload operations and supports a flexible record when the record is in the player but the player is stopped. Members 46 are mounted along the sides of the Bernoulli plate to help guide the received cover into the enclosure.

FIG. 2 shows the record cover in the player in the rearmost position with the upper flap 26 raised for loading or unloading a record. In this position, the front edge 20 (or a cutoff corner) actuates a limit switch 47 to electrically signal that the record is in position. The limit switch is mounted on plate 45. Limit switches are commercially available and the schematic representation of the drawing shows the relationship of the switch to the other components.

A permanent magnet 49 is carried on the underneath surface of a support 50 that is mounted on posts 51 that are mounted on plate 45. The underneath surface of support 50 faces the record cover flap 26 (or 27 if the record or cover is flipped over) and is formed on an angle to correspond closely to the angle of the cover flap when the cover is in the position shown in the drawing.

FIG. 2 also shows a door 53, a pair of arms 54 that pivotally connect to the door at their front ends and are mounted on the Bernoulli plate at the rear by supports 56 and flexible hinges 57, and supports 58 for cam surfaces 59 that cooperate with arms 54 and pins 60 to lift the door as it is manually actuated by a user. This structure is shown in more detail in FIGS. 3 and 4.

A bar 62 that is mounted on the supports 58 and carries a permanent magnet 63 for opening the flaps 26, 27 and a permanent magnet 64 is mounted in the Bernoulli plate 45 as will be explained later.

Notice that when the cover is in position to operate the limit switch, the disk is positioned between two posts 51 at the rear of the player and the two spacers 31 at the rear of the cover. The spacers center the disk in the cover if it is in the rearmost position in the cover. If the disk moves sideways in the cover, the spacers 31 cause it to also move forward. The front edge of the disk is preferably about 1/32 inch from the front edge of the cover (the distance has been exaggerated in the drawings). If the disk has moved forward accidently or as an incident of being moved sideways, the edge of the disk will project slightly beyond the cover edge and will bear against posts 51 as the disk is loaded into the player and before the limit switch is actuated to operate the clamp at the rear of the player. The contact between the disk and the post urges the disk sideways to be suitably centered over the drive mechanism that will be explained next.

Figure 4:
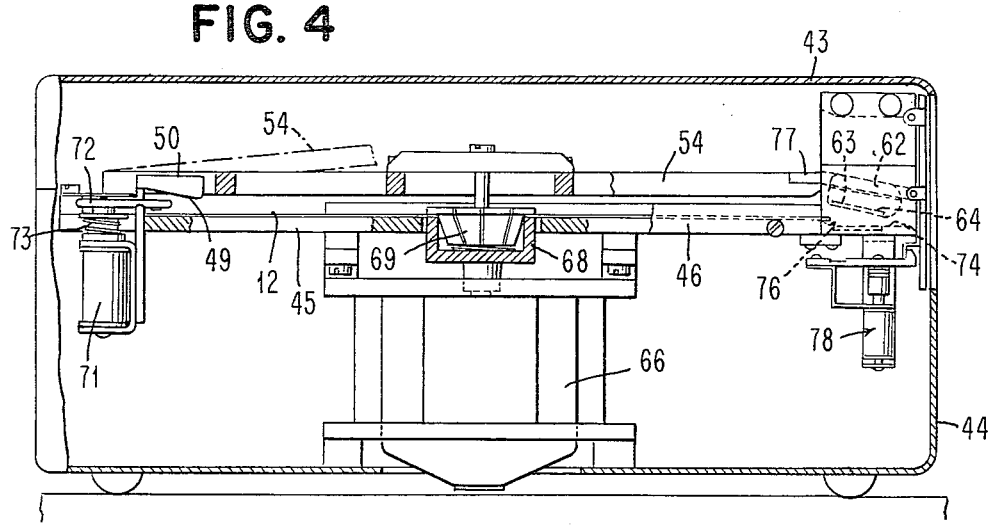
FIG. 4 is an end view of the video recorder with the cover partly broken away and door closed.

The Player of FIGS. 3 and 4

FIGS. 3 and 4 can be easily related to the previous description of FIG. 2 from the dot-dashed outline of the record cover 14, the recording disk 12, the Bernoulli plate 45, the record cover guide 46, and the outer walls 43 and 44 of the enclosure. FIG. 3 also shows a slot 65 in the Bernoulli plate that carries the optical read head for the player (or a read/write head for the player/recorder). The optical components are located beneath the Bernoulli plate, away from the components that load and unload the record and cover, and these components can be of any conventional construction and are not further shown in the drawing.

When the disk is loaded into or unloaded from the player, the components that drive the disk are away from the path of the record cover and the disk across the Bernoulli plate. These components are conventional in magnetic diskette drives and are explained only in their relation to components that help to load or unload the disk. A motor 66 is suspended below the Bernoulli plate and carries a hub 68 that is flush with the upper surface of the Bernoulli plate. In the loading operation that will be described later, the disk is approximately centered over hub 68. An idler hub 69 is carried on the arms 54 introduced in FIG. 2 which is lowered to the position shown by solid lines in FIG. 4 to connect the disk to the hub when the door is closed. Hub 69 is raised to clear the disk when the door is opened as partially shown in FIG. 2 and as is indicated by the dashed line position of arms 54 in FIG. 4.

FIGS. 3 and 4 also show the stationary magnet 49 and its support 50 at the rear of the enclosure. A solenoid 71 is mounted below the Bernoulli plate and operates lever 72 that is raised upwardly by a spring 73 to be clear of the record cover and the disk. The lever projects into the space between the magnet support 50 and the Bernoulli plate 45 so that as the flaps of record cover are opened, the lever enters the cover in a position over the record and the lower flap.

FIGS. 3 and 4 show further details of the magnets 63, 64 that are located at the front of the player housing. The Bernoulli plate has a depressed step 74 along the front edge of the Bernoulli plate that cooperates with bar 62 to form a slot at the front of the enclosure. The slot helps to guide the cover into the player at the appropriate angle. The step 74 permits the lower flap of the record cover to enter the slot below the level of the upper surface of the Bernoulli plate and thus below the lower surface of a disk that is supported by the plate. The plate has a smooth incline 76 in this region that raises the lower flap to slide under the disk as the record cover is inserted through the slot of the player to retrieve a record.

As can be seen in FIGS. 2 and 3, the bar 62 that supports the upper front magnet 63 has a cut out portion to receive a connecting part 77 of the arms 54 when the door is closed. The bar 62 and the underlying portion of the Bernoulli plate step area 74 are cut away as shown by dashed line 80 in FIG. 3 and as shown in FIG. 2 to provide clearance for the hand of a person opening the door to grasp a record. The magnets 63 and 64 are also shaped according to this line.

FIG. 4 shows a solenoid operated latch 78 that holds the door closed until the user has operated a switch (not shown) mounted on the enclosure case 43 or 44 to stop the motor and until the motor has actually come to a stop. The latch is not shown in FIG. 3 but is suitably located on the edge of the Bernoulli plate out of the path of the disk and cover.

The Disk Loading Sequence—FIG. 5

Figure 5A:
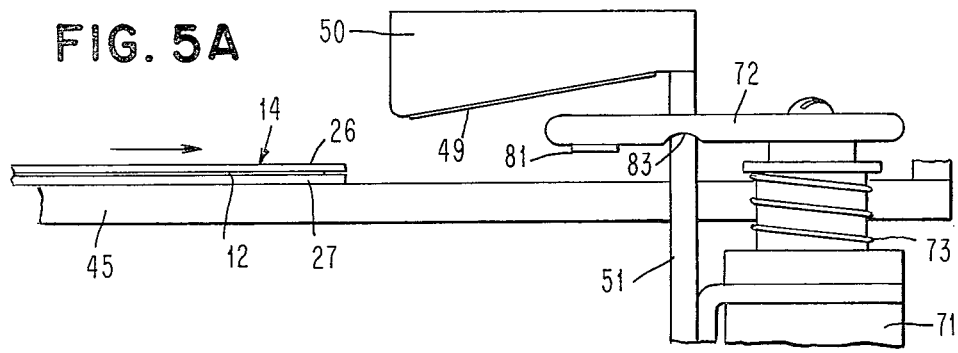
FIGS. 5A through 5D are a sequence of simplified views of a record, the record cover, and the player illustrating the steps of unloading a record from the player.

FIG. 5A shows the disk 12 carried by the cover 14 as the cover is manually pushed across the Bernoulli plate 45 toward the rear of the player. The edges of the flaps 26, 27 are shown separated from the disk so that the disk can be seen in each view of FIG. 5, but the flaps actually remain approximately sealed along the front and the sides of the cover during this operation.

Figure 5B:
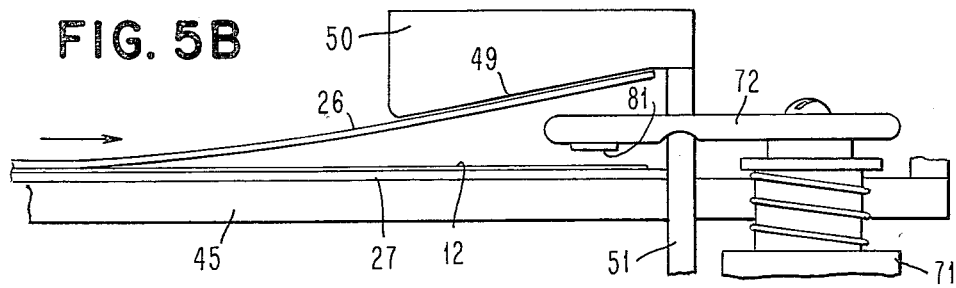

As the front edge of the record cover passes under the rear magnet 49, the upper flap 26 is attracted to the magnet and is lifted upward away from the recording disk. FIG. 5B shows the cover in the full rearmost position when the front edge of the cover is stopped against the magnet support 51. Notice that the slope of the magnet corresponds to the angle of the lifted flap and the structure thereby maintains contact between the magnet 49 and the magnetic inserts of the flap along the length of the inserts as the cover is moved into the player. Also notice that this angle on the magnet brings the magnet into close proximity to the record cover flap at the leading edge of the flap so that the magnet provides an initially strong pull on the flap at an optimum point on the flap when the flap is considered as a lever. Also, the sloping shape of the magnet provides a raised space for the clamping lever, and it provides more area of contact as the flap is raised higher.

As the record and cover are moved to the full rearmost position of FIG. 5B, the raised upper flap of the cover passes over the clamp arm so that the clamp arm is positioned directly over the outer edge of the disk and the underlying lower flap 27. The record will ordinarily have an outer circumferential area where there is no recording and the contact between the clamp arm and the recording disk is preferably limited to this area outside the recording tracks.

Figure 5C:
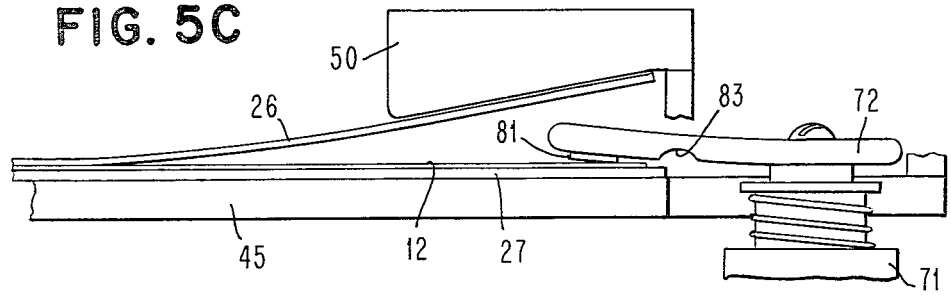
Figure 5D:
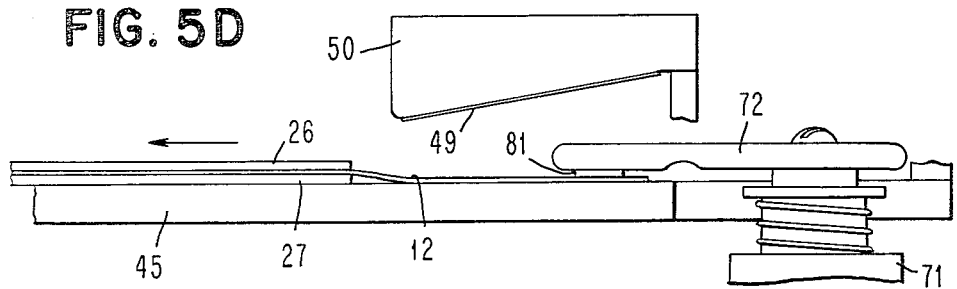

In the rearmost position of FIG. 5B the cover activates the limit switch (FIG. 2) and the switch energizes the solenoid 71 to operate the clamp arm 72 against the disk and the lower flap as is shown in FIG. 5C. The clamp has a pad 81 of a suitable material having a coefficient of friction to provide a firm but cushioned grip on the disk. The cover has a lining of a suitable low friction material such as flocking to have a low coefficient of friction to the disk. Either the Bernoulli plate or the outside of the flap of the cover has a low friction coating in the region of the clamping position so that the disk can be easily slid outward from the clamp and from the disk as is shown in FIG. 5D.

The clamp is arranged to maintain pressure on the disk to offset the frictional pull of the cover on the disk as the cover is manually moved fully away from the player. As FIGS. 5C and D show, the solenoid has only a full up and a full down position, but the clamp arm is flexible to maintain suitable pressure either on the disk or on the combination of the disk and the lower cover flap 27. As the drawing shows, the clamp arm has a groove 83 that forms a hinge of selected restoring force for the arm.

The electrical circuit to the solenoid is deenergized after the cover has been removed. Conveniently, the circuit is opened by a limit switch (not shown) that opens when the loading door of the player housing has been manually closed. Alternatively, or if the player has an open slot instead of a door, the solenoid release switch can be incorporated in the motor control circuits so that the solenoid is released after a motor start switch has been manually closed but before the motor is energized for starting. The operation of the solenoid controlling switches can be summarized by the following Boolian expressions for setting and resetting a latch that controls the solenoid: Set=limit switch actuated AND LOAD BUTTON depressed OR UNLOAD BUTTON ACTUATED AND MOTOR STOPPED, Reset=limit switch actuated AND START BUTTON ACTUATED OR UNLOAD BUTTON DEPRESSED AND LIMIT SWITCH ACTUATED. Equivalent circuits for other arrangements of panel switches and interlocks or other starting and stopping sequences will be apparent.

The Record Unloading Sequence—FIG. 6

FIG. 6A shows the front edge 20 of the record cover 14 as it is entered into the player to unload a recording disk. The front upper magnet 63 picks up the upper flap 26 and the front lower magnet 64 holds the lower flap on surface 75 which is slightly lower than the surface of the Bernoulli plate 45 that supports the previously loaded disk 12. The disk overhangs surface 74 and the lower flap so that as the cover is moved rearwardly from the position of FIG. 6A, the lower flap rides up surface 76 and picks up the front most edge of the disk as shown in FIG. 6B. Next, as the cover is moved rearwardly from the position of FIG. 6A, the magnetic inserts 35, 36 (not shown) on the upper flap 26 move clear of the front upper magnet 63 and the upper flap drop to the position shown in FIG. 6B.

FIG. 6C shows the cover being moved further to the rear of the player with the clamp solenoid 71 energized to hold the disk to prevent the user from accidently removing the cover with the disk only partly with the cover. A switch (not shown) that is electrically parallel to the limit switch is closed as part of the conventional sequence initiated by the user to turn off the drive motor and open the door 53.

As the cover is moved into the position of FIG. 6D, the uper flap is lifted by the magnet 49 in the way already described for the load operation. As the lower flap slides under the disk, it lifts the lever 72 (as in FIG. 5C). FIG. 6E shows the solenoid released so that the cover can be withdrawn with the disk free to remain within the cover. The circuit for releasing the solenoid is opened by the limit switch 47. A user operated panel switch controls limit switch 47 to respond differently on load and unload operations.

Notice that some of the steps of the load sequence of FIG. 5 can also be thought of as part of the unload sequence of FIG. 6 and vice versa. Thus, the load sequence is more fully illustrated by the sequence 5A, 5B, (or 6E), 5C, 6D, 5D, (or 6C), 6B, 6A.

From the description of a preferred embodiment of the invention, those skilled in the art will recognize a range of equivalent structures within the spirit of the invention and the scope of the claims.

Having thus described out invention, what we claim as new, and desire to secure by Letters Patent is:

1. A record cover for a video disk or the like comprising:
    an upper part and a lower part of a non-magnetic material having a generally rectangular perimeter sealed together along a back edge, open along a front edge and sealed only along a part of each side edge to form separable front flaps, and
    a first insert of a paramagnetic material carried by the flap of the upper cover part and extending rearwardly for a predetermined distance from the front edge of the flap,
    a second insert of paramagnetic material carried by the lower flap, the first and second inserts being laterally offset from each other.

2. The cover of claim 1 including a plurality of first and second inserts carried in symetrical patterns so that the pattern carried by said upper and lower flaps that remains unchanged when the record cover is turned over for playing either side of the disk.

3. The record cover of claim 1 including spacers mounted in the cover in position to align the record between the side edges of the cover as the record is urged toward the rear of the record cover.

4. A video disk and player system comprising:
    a video disk and a cover for the disk having an upper part and a lower part with a generally rectangular perimeter having upper and lower flaps that open along a front edge for removing a record, and inserts of paramagnetic material carried by the upper part of the record cover along the front edge and extending rearwardly for a predetermined distance,
    a record player comprising a housing having an opening at the front for receiving a record cover containing a video disk for a load operation and for receiving an empty cover for an unload operation and having means for supporting a record when the record is stationary and for supporting a record cover when the record cover is inserted into the player housing for loading or unloading a record,
    a first permanent magnet mounted at the rear of the player in a position to lift the uppermost flap of a record cover as a cover is moved into the extreme rearmost position within the enclosure,
    a clamp located in the enclosure at the position of an outer, non-information bearing, portion of a disk when the record cover is in its rear most position and further positioned to extend under the uppermost flap of the record cover when the flap is raised by the permanent magnet, and
    means for selectively operating the clamp to hold the record and to releasably hold the underlying lower flap of the record cover against the support plate to permit the record cover to be removed from a disk only after the disk has been loaded into the player.

5. The system of claim 4 wherein the player includes a second permanent magnet and means mounting said second permanent magnet near the front of the enclosure in a position to lift the front flap of an empty record cover to receive the edge of a disk on a record unload operation.

6. The system of claim 4 wherein:
    said record support includes a step portion located under said second permanent magnet and cooperating with the second permanent magnet support to form a slot for guiding the cover into the player enclosure and includes a ramp portion extending rearwardly to a point under the edge of a disk for lifting the lowermost flap of the cover to receive a disk as the cover is advanced past said step into the enclosure during an unload operation, and
    a third permanent magnet mounted in said step portion in a position to hold the lowermost flap of the cover against the step and thereby below the edge of a disk during an unload operation.

7. The system of claim 4 wherein said record cover includes two spacers located on opposite sides of the front to back center line of the cover in a position for positioning the front edge of the record near the front edge of the cover, and wherein said enclosure includes two stops positioned to limit the rearward travel of the record cover into the enclosure and to cooperate with said record cover spacers to align the disk during a load operation in the event that the edge of the disk protrudes beyond the front edge of the cover.

8. A player for a video record comprising:
    means for guiding a record cover into a rearwardly most position within the enclosure for record loading and unloading operations,
    a first permanent magnet located near the front of the enclosure for cooperating with paramagnetic inserts in the record cover to open the cover to permit the upper part of an empty record cover to slide over the edge of a video disk that is to be unloaded from the player,
    a second permanent magnet positioned at the rear of the player arranged to cooperate with paramagnetic inserts in the record cover to raise the front portion of the upper record cover part as the record cover is moved into a rearmost position within the enclosure,
    a clamp positioned below the second permanent magnet means to extend into a record cover when the cover is in the rearmost position and to be positioned over an edge portion of a video disk being loaded or unloaded,
    means responsive to the positioning of the record cover in the rearmost position to operate the clamp to hold the video record against the friction forces of removing a cover from a clamped disk.

* * * * *